Nov. 8, 1932.  M. EHLINGER  1,887,084
WATER LEVEL EXPANSION REGULATOR FOR USE IN
CONNECTION WITH BOILERS OR THE LIKE
Filed Sept. 8, 1930   2 Sheets-Sheet 1

Marcel Ehlinger
INVENTOR
By
his Attorney.

Nov. 8, 1932.                M. EHLINGER                1,887,084
        WATER LEVEL EXPANSION REGULATOR FOR USE IN
           CONNECTION WITH BOILERS OR THE LIKE
                   Filed Sept. 8, 1930       2 Sheets-Sheet 2
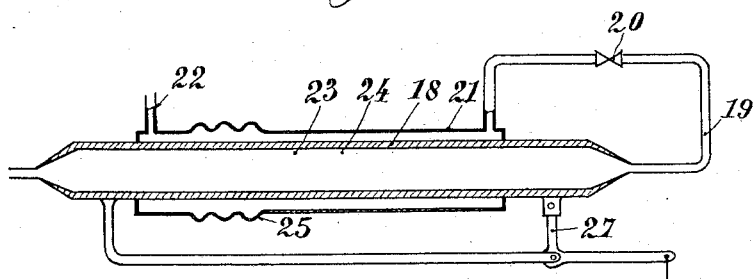
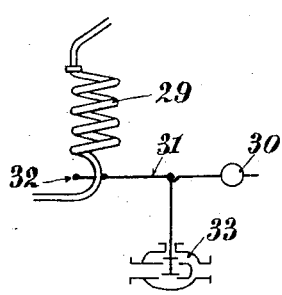
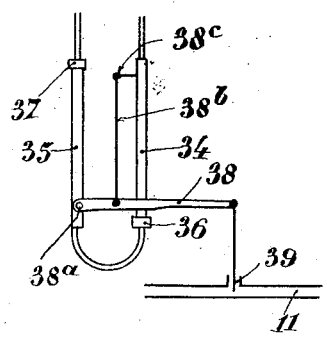
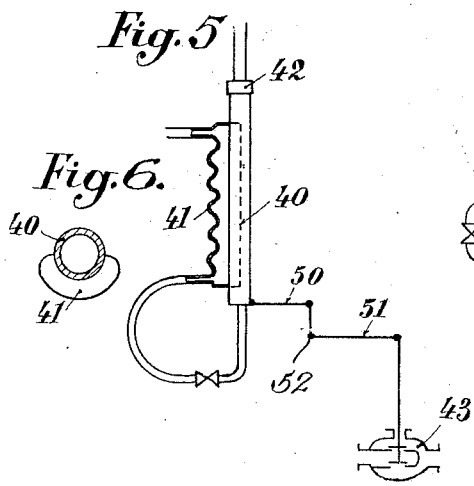
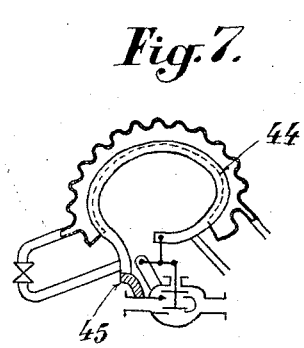
Marcel Ehlinger
INVENTOR;
By
   Attorney.

Patented Nov. 8, 1932

1,887,084

UNITED STATES PATENT OFFICE

MARCEL EHLINGER, OF MULHOUSE, FRANCE, ASSIGNOR TO SOCIETE ALSACIENNE DE CONSTRUCTIONS MECANIQUES, OF MULHOUSE, FRANCE

WATER LEVEL EXPANSION REGULATOR FOR USE IN CONNECTION WITH BOILERS OR THE LIKE

Application filed September 8, 1930, Serial No. 480,593, and in France October 17, 1929.

This invention relates to a device for controlling the water level in boilers, and in a general way, for controlling the supply of a fluid to any receptacle where a liquid is in contact with its vapour.

Water level expansion regulators for use with boilers are already known, which consist of a slightly inclined straight tube, one end of which is connected with the water space of the boiler while the other end is connected with the steam space, in such a manner that the level which is established in said tube is the same or approximately the same as the water level in the boiler. Since the coefficient of heat transmission between the condensing steam and the metal is higher than the coefficient of heat transmission between water and metal, expansion of the tube is greater or less according to the height of the water level in the boiler. Use is made of the variations in the length of the tube to operate a cock which controls the water supply to the boiler.

Such apparatus are efficient with boilers adapted to contain a large volume of water, but they are not satisfactory with boilers having but a small water capacity, owing to the slow displacements of the movable part of the apparatus while the water is very rapidly vaporized.

The present invention has for its object to provide a water level expansion regulator for use with boilers with very active vaporization. It is based on the fact that the coefficient of heat transmission from a fluid to a wall becomes higher as the proportion of liquid in the fluid becomes greater. If one face of the wall is cooled or heated in an approximatively constant manner, the other face being in contact with the fluid containing a variable proportion of liquid and flowing at a substantially constant temperature, the mean temperature of the wall, and consequently the length of a wall section, will depend upon said proportion of liquid.

The arrangement according to the present invention is such that the proportion of liquid in the fluid is caused to vary with the water level in the boiler; as a result, the length of a wall section will also vary with the water level. Whenever necessary, such variations in length may be amplified and transmitted, in any suitable manner, to a device controlling the water supply to the boiler, so that the water level will be maintained at a predetermined height.

The accompanying drawings show diagrammatically various embodiments of this invention:

Fig. 2 shows a device wherein the regulating tube is more or less cooled externally by the fluid;

Figs. 3, 4, 5 show various modifications of the invention.

Fig. 6 is a cross-section of Fig. 5, and

Fig. 7 shows another modification.

Figure 1:
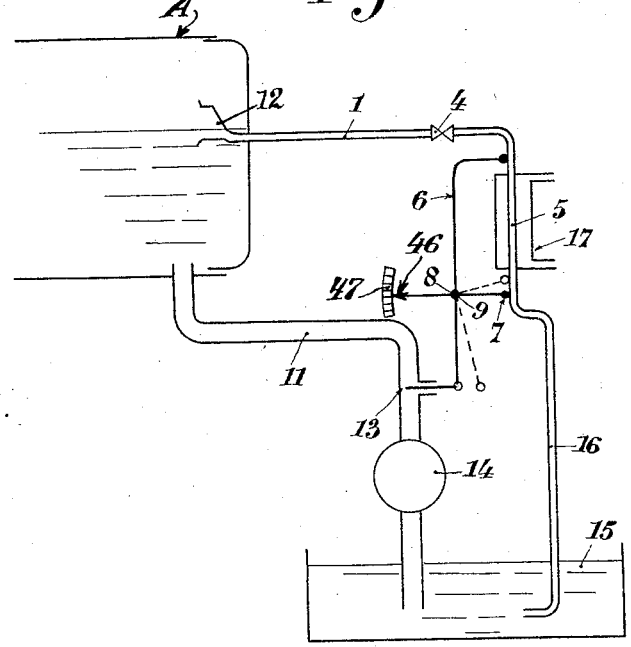
Fig. 1 shows a device according to the invention, wherein the regulating fluid is a mixture of steam and water.

In Fig. 1, 1 denotes a tube, one end of which is connected with the steam space of the boiler, shown as a boiler drum A, while the other is opened to the atmosphere. 12 is a large port opening both into the water and steam spaces of said boiler and through which a mixture of water and steam escapes into tube 1. 4 is a throttle for limiting the amount of mixture discharged through tube 1. A portion 5 of the tube is fastened at a stationary member 6 and another point of said tube is operatively connected to a lever 8, having a fixed pivot 9. Lever 8 is connected in any suitable manner with a valve 13, fitted on the water supply pipe 11 of the boiler. 14 illustrates the supply pump, which draws water from feed tank 15 into which is immersed an extension 16 of tube 1. Throttle 4 may be located beyond point 7.

The operation is as follows: Tube 5 is externally cooled, and is internally heated by the mixture that passes through it. This results in the tube acquiring a mean temperature confined between that of the medium in contact with its external surface and that of the mixture. Such mean temperature approaches more nearly to that of the mixture as the coefficient of transmission from the mixture to the wall through convection becomes higher, that is to say as the proportion of water in the mixture becomes greater.

Consequently, when the water level gets lower in the boiler, the quantity of water mixed with steam which escapes through tube 1 is smaller. The temperature of tube 5 is reduced and its length decreases, thus moving lever 8 to thereby open valve 13. The supply of water is thus increased and the level rises. As the water level rises in the boiler, the quantity of water mixed with steam which flows through tube 5 is larger; the temperature and consequently the length of said tube increase, thus moving valve 13 toward the closed position. It will be understood that tube 5 acts as a regulator for keeping a certain level in the boiler. Variations of expansion in the regulator are very rapid, steam flowing very rapidly through tube 1 (in a fraction of a second).

Any other controlling device could be provided to take the place of throttle-valve 13. For instance the variations of expansion may be used to act upon the speed of the feed water pump.

When external cooling of the tube is secured only by the surrounding air, the mean temperature of the regulating tube is very near that of the mixture. For the purpose of increasing the efficiency of the external cooling of tube 5, in a view of increasing the variations of its mean temperature, a water circulation at a constant temperature may be provided inside a jacket 17 surrounding the tube. External cooling of the tube may also be amplified by the use of radiating fins or the like. Further, steam and water may be caused to mix together outside the boiler, if desired, the device being then provided with water and steam inlet pipes.

In Fig. 2, the mixture of water and steam is supplied from the boiler through tube 1 (Fig. 1) to the inner part of a regulating conduit 18, and then through a tube 19 provided with a throttle 20, where it expands and is consequently cooled; it then flows through a jacket 21, surrounding tube 18 and escapes through tube 22.

Transmission of heat from the fluid which circulates within tube 18 and from tube 18 to the fluid flowing in the annular channel which surrounds tube 18 do depend on the speed of said fluids on the one hand and on their composition (mixture of steam and water in various proportions) on the other hand. Experience shows that for a given pressure, the retraction of tube 18 increases for an increase of the proportion of steam in the mixture of steam and water which escapes from the boiler, that is with an increasing of the cooling due to the expansion of the fluid through throttle 20.

In order to relieve jacket 21 from excessive strains, corrugations 25 are provided thereon, which make it resilient. Throttle 20 may be advantageously replaced by a long spirally wound pipe of small section. Variations in the length of tube 18 are transmitted to valve 28 through the medium of lever 27.

The regulating tube may be placed in any position and at any distance from the boiler. It will be advantageously placed near the member it is designed to control. It may have any suitable shape. For instance, in Fig. 3, the regulating tube 29 is spirally wound thus acting as a spring, and it is tensioned by a counter-weight 30 depending from a lever 31, fulcrumed at a stationary point 32. The axial length of the regulating coil varies with the temperature of the metal. The variations in axial length are transmitted to valve 33.

In Fig. 4, two regulating tubes 34 and 35, are provided in series, the corresponding ends thereof being held fast at 36 and 37. The individual expansion of said tubes are added up through a lever 38 pivoted at $38^a$ on tube 35 and connected with a link $38^b$, pivoted at $38^c$ on a member rigid with tube 34. Lever 38 acts on the valve 39 of the water supply pipe 11.

In Fig. 5, which shows a modified form of the device of Fig. 2, regulating tube 40 has only half its periphery (Fig. 6) surrounded with jacket 41, for the circulation of expanded steam. Tube 40 is held fast at one end at 42. According to the rate of the flow of expanded steam, the axis of said tube is more or less curved and the lower end thereof is caused to act upon valve 43 through a link 50, pivotally connected to a crank lever 51, pivoted at a stationary point 52.

The wall of tube 40 which is not jacketed and hence is in direct contact with the surrounding air is at a temperature not substantially differing from that of the inwardly circulating fluid as the air cooling is comparatively very small. The jacketed part is cooled by the fluid circulating within jacket 41. This jacketed part of the wall of tube 40 is hence at a lower temperature than the other part though there is no heat insulation between both and the difference of temperature between these two parts depends on the degree of cooling of the fluid within jacket 41. Experience shows in fact that with a boiler arranged to operate at a pressure of 1400 pounds per square inch and a regulating tube 40 of 700 m/m length, the free end of the tube varies from 0 to 9 m/m when the water level within the boiler varies from its lowermost to its uppermost position and the centre of curvature is located on the jacketed side.

The advantage of this device is that operation thereof takes place in practice whatever may be the temperature of the regulating fluid and is principally dependent upon the difference of temperatures between the hot and cold walls of the tube.

Thus, the boiler pressure will be able to vary without in any way influencing the water level.

Experience shows that in the example given above, the device is operative for pressures varying in practice from 550 to 1500 pounds per square inch.

This could of course be obtained through any compensating apparatus in the other embodiments of the invention.

The arrangement illustrated in Fig. 7 is based upon the principle of the system shown in Fig. 5, the regulating tube 44 being spirally shaped, and one end thereof being fixed at 45. The shape of this tube varies after the manner of a Bourdon pressure gauge which would be responsive to temperature differences. In this manner, the amplitude of the deformations may be considerable with a very compact apparatus.

For every position of the water level in the boiler, there is a predetermined corresponding length, torsion or flexion of the regulating tube. The regulating tube may hence be associated with a pointer, such as 46 of Fig. 1, which moves over a dial 47, scaled in water level.

The invention is obviously independent of the type of feed water control valve, of the boiler type, of the steam offtake arrangement in the boiler provided that said arrangement is such that the proportion of steam contained in the mixture entering tube 1 varies in accordance with the level of the water in the boiler. It may be applied for regulating the supply of any tank with any liquid in the presence of its vapour. The regulating tube may be made of any metal.

Having now described my invention what I claim as new and desire to secure by Letters Patent is:

1. In combination with a receptacle adapted to contain a liquid in contact with its vapour, means for controlling the supply of liquid to said receptacle, a metallic surface, means for circulating in contact with one face of said surface a mixture formed by a portion of the liquid and vapor contained in said receptacle, and such that the proportions of vapor and liquid which form the mixture vary with the liquid level in the receptacle, the opposite face of said metallic surface being in contact with a medium at a substantially constant temperature, whereby said surface assumes a variable mean temperature and is deformed by thermal expansion, and means for operatively connecting said metallic surface with said liquid supply controlling means.

2. In combination with a receptacle adapted to contain a liquid in contact with its vapour, means for controlling the supply of liquid to said receptacle, a metallic conduit for discharging a mixture formed by a portion of the vapor and liquid contained in content of said receptacle, and such that the proportions of vapor and liquid which form the mixture vary with the liquid level in the receptacle, whereby one face of said conduit is in contact with said mixture, the opposite face of said metallic conduit being in contact with a medium at a substantially constant temperature, whereby said conduit assumes a variable mean temperature and is deformed by thermal expansion, and means for operatively connecting said metallic conduit with said liquid supply controlling means.

3. In combination with a receptacle adapted to contain a liquid in contact with its vapour, means for controlling the supply of liquid to said receptacle, a metallic surface, means for circulating in contact with one face of said surface a mixture formed by a portion of the vapor and liquid contained in said receptacle, and such that the proportions of vapor and liquid which form the mixture vary with the liquid level in the receptacle, a cooling jacket on the opposite face of said metallic surface, means for circulating a fluid at a substantially constant temperature through said jacket, whereby said surface assumes a variable mean temperature and is deformed by thermal expansion, and means for operatively connecting said metallic surface with said liquid supply controlling means.

4. In combination with a receptacle adapted to contain a liquid in contact with its vapour, means for controlling the supply of liquid to said receptacle, a metallic surface, means for circulating in thermal contact with one face of said surface a mixture formed by a portion of the hot vapour and hot liquid contained in said receptacle, said means being such that the composition of said mixture is varied in dependence on the liquid level in the receptacle, means for expanding the vapour contained in said mixture and for thereby lowering its temperature, means for circulating the mixture containing said expanded vapour in contact with the opposite face of said metallic surface, whereby said surface assumes a variable mean temperature and is deformed by thermal expansion, and means for operatively connecting said metallic surface with said liquid supply controlling means.

5. In combination with a receptacle adapted to contain a liquid in contact with its vapour, means for controlling the supply of liquid to said receptacle, a metallic tube, a cooling jacket surrounding a portion only of its periphery, means for circulating through said tube a mixture formed by a portion of the vapor and liquid contained in said receptacle, and such that the proportions of vapor and liquid which form the mixture vary with the liquid level in the latter, whereby said tube assumes a variable mean temperature and is curved by thermal expansion and means for operatively connecting said metallic tube with said liquid supply controlling means.

6. In the combination of a receptacle adapted to contain a liquid in contact with its vapour with control means for automatically regulating the supply of liquid to said receptacle by the liquid level, control means including a metallic surface, means for circulating in contact with at least one face of said surface a mixture formed by a portion of the vapour and liquid contained in said receptacle and such that the proportions of vapour and liquid which form the mixture vary with the liquid level in the receptacle, the opposite face of said surface being in contact with a medium at a temperature different from that of said mixture when in contact with said first named face, whereby said metallic surface is subjected to changes in dimensions owing to thermal expansion and contraction, and means responsive to said changes in dimensions of the metallic surface to vary the supply of liquid.

7. In the combination as claimed in claim 4, means limiting the contact of said mixture after expansion of the vapour contained therein with the metallic surface to a portion only of the periphery of the latter.

8. In the combination as claimed in claim 6, means whereby an unequal distribution of heat is afforded upon the periphery of the metallic surface, whereby the changes in dimensions of the latter result in changes of shape or distortions of the same.

9. In the combination of a receptacle adapted to contain a liquid in contact with its vapour with automatic control means for the liquid supply depending on the liquid level within the container, said control means including a tubular member made of an expansible substance, means for circulating therein and in heat exchange relation with its wall, a mixture formed by a portion of the vapour and liquid contained in the receptacle and such that the proportions of vapour and liquid which form the mixture vary with the liquid level in the receptacle, a jacket surrounding said tubular member on at least part of its length and part of its periphery, means for expanding the vapour contained in the mixture flowing out of the tubular member, thereby cooling said mixture, and for thereafter circulating said cooled mixture within said jacket and in heat exchange relation with the outer face of the tubular member, and means responsive to the expansion and contraction of said tubular member to vary the supply of liquid.

10. In the combination of a receptacle adapted to contain a liquid in contact with its vapour with control means for automatically regulating the liquid supply by the liquid level within said receptacle, control means including a nozzle opening at a determined level in said receptacle both in the liquid and vapor spaces thereof, a metallic surface, means for circulating in contact with at least one face of said surface, the mixture of vapor and liquid entering said nozzle, the opposite face of said surface being in contact with a medium at a temperature different from that of said mixture when in contact with said first named face, whereby said metallic surface is subjected to changes in dimensions owing to thermal expansion and contraction and means responsive to said changes in dimensions of the metallic surface to vary the supply of liquid.

In testimony whereof I have signed my name to this specification.

MARCEL EHLINGER.